United States Patent [19]
Gray, Jr. et al.

[11] Patent Number: 5,505,527
[45] Date of Patent: Apr. 9, 1996

[54] ANTI-LOCK REGENERATIVE BRAKING SYSTEM

[75] Inventors: Charles L. Gray, Jr., Pinckney; Karl H. Hellman, Ann Arbor; Ronald M. Schaefer, Novi, all of Mich.

[73] Assignee: The United States of America as represented by the Administrator, U.S. Environmental Protection Agency, Washington, D.C.

[21] Appl. No.: 405,092

[22] Filed: Mar. 16, 1995

[51] Int. Cl.$^6$ .................................................. B60L 7/24
[52] U.S. Cl. .................... 303/3; 60/413; 180/165; 180/305; 303/152
[58] Field of Search ..................... 303/3, 10–12, 303/100; 60/413–418; 180/305–308, 165, 53.4, 65.1, 65.2, 65.3, 65.6, 301; 477/68, 52, 58, 61, 92, 188; 188/290–296, 271

[56] References Cited

U.S. PATENT DOCUMENTS

| | | | |
|---|---|---|---|
| 3,700,060 | 10/1972 | Keene et al. | 180/165 |
| 3,903,696 | 9/1975 | Carman | 180/165 |
| 4,098,083 | 7/1978 | Carman | 180/165 |
| 4,098,144 | 7/1978 | Besel et al. | 180/165 |
| 4,993,780 | 2/1991 | Tanaka et al. | 303/3 |
| 5,326,158 | 7/1994 | Ohori et al. | 303/3 |

Primary Examiner—Douglas C. Butler
Attorney, Agent, or Firm—Lorusso & Loud

[57] ABSTRACT

A vehicular powertrain with regenerative braking includes a plurality of wheels and a brake pedal which, upon engagement, is activated first into a first zone of operation and then into a second zone of operation. A braking detector detects either a released state or an engaged state for the brake pedal and, if in the engaged state, detects if the pedal is in the first or the second zone of operation. Friction brakes brake a pair of the wheels, responsive to detection of the brake pedal within the second zone of operation. The hydraulic portion of the drivetrain includes an accumulator for storing hydraulic fluid under pressure and a reservoir for storing the hydraulic fluid at a lower pressure. A pump/motor is located in the high pressure line for operation as a motor to drive the drive wheels in a drive mode and for operation as a pump driven by the drive wheels in a braking mode. A prime mover has its inlet connected to the reservoir through a low pressure line and an outlet connected to the accumulator through a high pressure line and hydraulically drives said pump/motor in its motor mode. A controller switches the pump/motor into the braking mode responsive to detection of an engaged state for the brake pedal and into the drive mode responsive to detection of the released state of the brake pedal. A switch valve connects the high pressure line to the accumulator in the braking mode and to the reservoir in the drive mode.

6 Claims, 1 Drawing Sheet

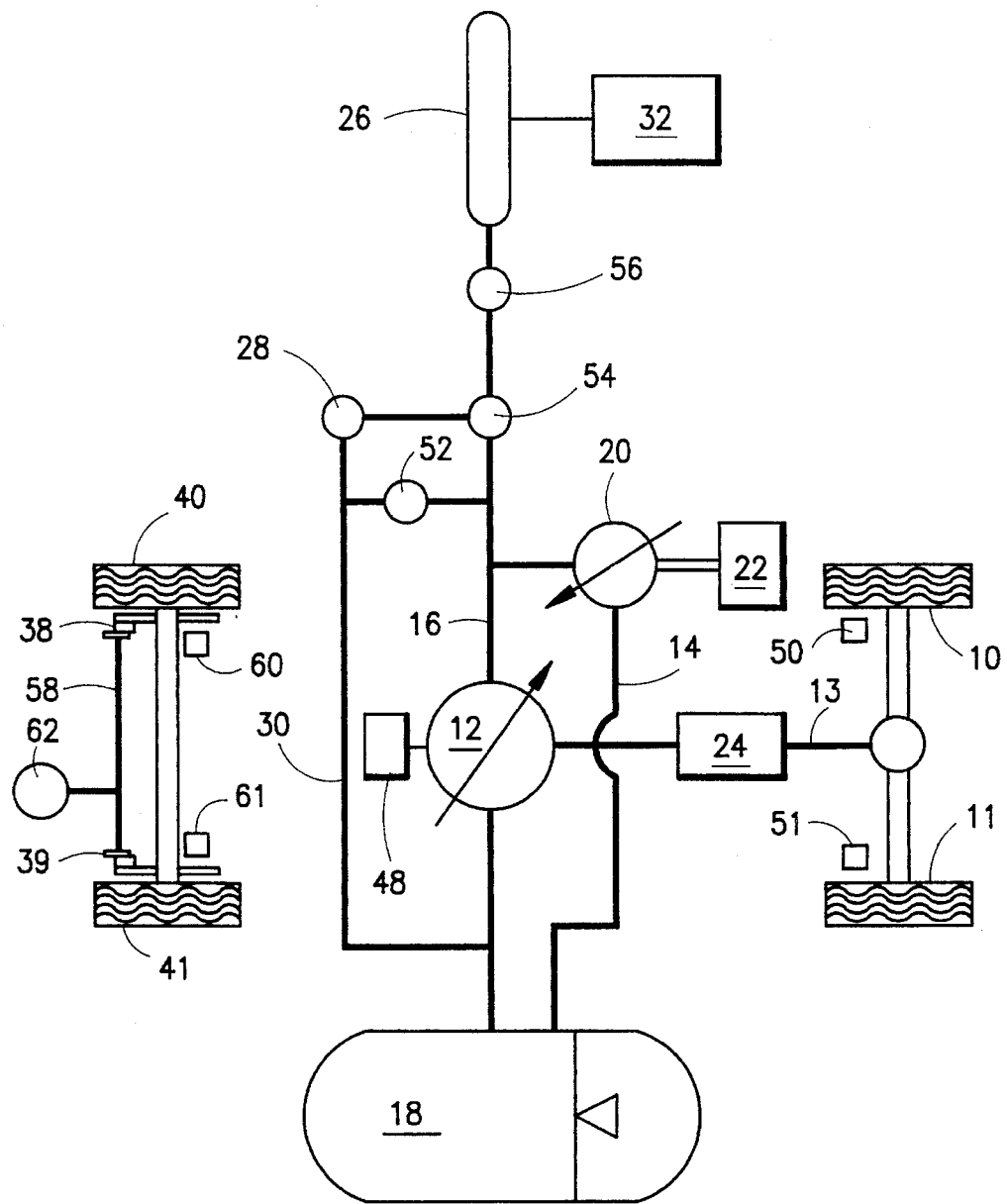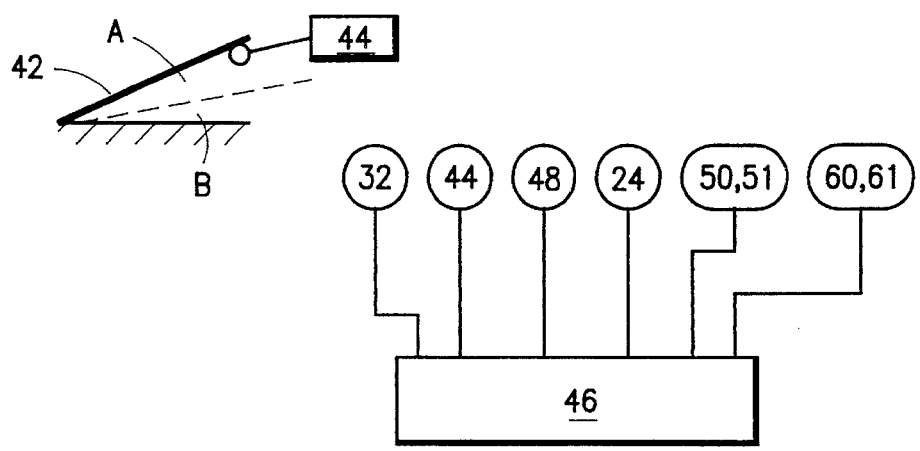

ANTI-LOCK REGENERATIVE BRAKING SYSTEM

BACKGROUND OF THE INVENTION

1. Field of the Invention

The present invention relates to a regenerative and anti-lock braking system for motor vehicles.

2. The Prior Art

The growing utilization of automobiles greatly adds to the atmospheric presence of various pollutants including greenhouse gases such as carbon dioxide. Accordingly, a need exists for significant improvement in the efficiency of fuel utilization for automotive powertrains.

Braking requires the removal of kinetic energy from a vehicle in motion. Conventional braking systems do this by means of friction, usually by causing brake linings to rub against a drum or rotor at the command of the driver. Kinetic energy is converted to heat and dissipated to the atmosphere, never to be recovered again (up to 35% of the energy used in typical urban driving is lost to friction brakes). Wheel lock-up, and resultant skidding and loss of control, has always been a possibility in rapid braking because the degree of braking is controlled by the skill of the driver, who has little direct knowledge about the degree of braking that would be necessary to cause a skid.

Anti-lock braking systems have recently been developed to prevent wheel lock-up, but these systems are designed for use with the inefficient friction method of braking. Furthermore, they are used only on conventional automobiles that use traditional internal combustion powertrains. These vehicles cannot achieve regenerative braking without the addition of a secondary energy storage and retrieval system, which would add weight and expense to the car. Since braking would then include both regenerative means and friction means, the anti-lock braking system would have to be substantially modified.

Regenerative braking becomes practical if the vehicle utilizes an unconventional powertrain that inherently allows for recovery of vehicle inertia or kinetic energy via the wheels. Electric vehicles that use batteries are one example, in which the prime mover can either be powered by the battery (as a motor) to drive the wheels, or by the wheels (as a generator) to charge the battery. The effectiveness of regenerative braking systems is determined by the ability of the powertrain in question to absorb energy so as to effect an adequate degree of braking. The power uptake capacity of the powertrain, and the energy storage capacity remaining at any given time, are at least two conditions to which a regenerative braking system must be sensitive. Given these and other considerations, it must respond accordingly, delivering sufficient braking power from a combination of available sources until the driver's demand has been met. This determination often requires complex calculations and sophisticated, expensive hardware implementation. Also, most unconventional powertrains under investigation today are not capable of sufficient power uptake to stop a vehicle in panic braking conditions without significant use of friction brakes.

Anti-lock braking in a regenerative braking system is generally considered to be more difficult to achieve than in conventional anti-lock braking systems which involve only friction brakes. The braking effect provided by the regenerative braking circuit would have to be as rapidly and precisely controllable as conventional friction brakes. It is conceptually easiest to begin with friction brakes and then phase-in regenerative braking until the desired degree of braking is provided. If skidding occurs, friction braking could be reduced until skidding stops. However, it is more energy efficient to always begin with regenerative braking and engage friction brakes only if necessary. Furthermore, if the regenerative circuit is powerful enough, all normal braking can be done without engaging the friction brakes, allowing maximum energy recovery. This would mean that reliable anti-lock control would have to be effected through the regenerative circuit, requiring a regenerative braking means that has precise and rapid controllability. Thus, for maximum efficiency as well as practical anti-lock braking, only certain types of regenerative braking circuits and control schemes qualify.

In summary, without regenerative braking there is little chance for recovering the enormous amount of energy lost to braking. Most regenerative braking systems are costly and complex, would require some degree of friction braking, and would make it difficult to provide the safety of anti-lock braking.

SUMMARY OF THE INVENTION

Accordingly, it is an object of the present invention to provide for anti-lock braking in a regenerative braking mode even when friction braking is not involved.

Another object of the present invention is to improve the efficiency of fuel utilization for automotive powertrains and to reduce generation of pollutants including greenhouse gases such as carbon dioxide.

It is another object of the present invention to provide high-efficiency regenerative braking in a hydraulic drive train vehicle.

Yet another object of the present invention is to provide for anti-lock braking in such a system, without any significant additional components or loss of efficiency.

Still another object of the present invention is to provide for utilization of hydraulic energy storage, with an efficiency approaching 95%, in a regenerative braking system.

Another object of the present invention is to increase the percentage of total braking power that may be hydraulically absorbed for reuse before wasteful friction braking becomes necessary.

In accordance with the foregoing objectives, the present invention, in its broadest aspect, provides a vehicular powertrain with regenerative braking, wherein the vehicle has a plurality of wheels including drive wheels and is provided with a brake pedal which, upon activation, pivots first through a first zone and then through a second zone. Brake detection means detects whether the brake pedal is in an activated or released state and, if in an activated state, whether in the first zone or the second zone. The friction brakes engage and brake a pair of the plurality of vehicle wheels responsive to detection of operation of the brake pedal within the second zone of operation. A reversible motor is provided for driving the drive wheels in a drive mode and for reversing into a braking mode driven by the drive wheels. Motor control means switches the reversible motor into the braking mode responsive to detection of engagement of the brake pedal and into the drive mode responsive to detection of release of the brake pedal. A primary power source, e.g., electric motor or internal combustion engine (ICE), drives the reversible motor in its drive mode. A secondary power source is provided in parallel with the primary power source for contributing to the driving of the reversible motor in its drive mode and for receiving and storing power from the reversible motor in its braking mode.

In a preferred embodiment, the vehicular powertrain of the present invention is a hydraulic powertrain and the vehicle has a plurality of wheels including drive wheels and a brake pedal which, upon engagement, is activated first into a first zone of operation and then into a second zone of operation. A brake sensor detects a release state or an engaged state for the brake pedal and, if the engaged state is detected, detects either a first or a second zone of operation for the brake pedal. Friction brakes serve to brake a pair of the plurality of wheels responsive to detection of the second zone of operation of the brake pedal. The preferred embodiment has a hydraulic loop including a pump having an inlet connected to a reservoir through a low pressure line and an outlet connected to a high pressure line. The pump is driven by a prime mover, e.g., electric motor or internal combustion engine (ICE), and is connected through the low pressure line to a fluid reservoir. A reversible, expansible chamber device is located in the high pressure line for operation as a motor driven by the fluid in the hydraulic loop, to drive the drive wheels in a drive mode. In the braking mode, the reversible, expansible chamber device operates as a pump which is driven by the drive wheels. A controller switches the reversible, expansible chamber device into the braking mode responsive to detection of an engaged state for the brake pedal and into the drive mode responsive to detection of the released state for the brake pedal. Switch valving connects the high pressure line to the accumulator in the braking mode and to the reservoir in the drive mode.

If necessary, a conventional gear change transmission can be interposed between the reversible motor or reversible, expansible chamber device and the drive wheels.

The braking sensor is preferably a brake pedal position sensor.

The preferred embodiment may additionally include a pressure sensor for sensing the pressure of fluid in the accumulator and a dump valve switch for opening the high pressure line to the reservoir, responsive to detection of a pressure within the accumulator in excess of a pressure predetermined as a maximum allowable pressure for the accumulator.

BRIEF DESCRIPTION OF THE DRAWING

The sole drawing figure is a schematic diagram of a preferred embodiment of the present invention.

DESCRIPTION OF THE PREFERRED EMBODIMENTS

The sole drawing figure shows a preferred embodiment of the present invention utilizing a hydraulic drivetrain. The drive-train includes a pair of drive wheels 10 and 11 driven by a reversible, expansible chamber device 12 which is located in a hydraulic loop including low pressure line 14 and high pressure line 16, both in communication with a fluid reservoir 18, and a pump 20 having its inlet side connected to low pressure line 14 and its outlet side connected to high pressure line 16. Pump 20, in turn, is driven by a primary power source 22 which may be an electric motor or an internal combustion engine (ICE). A conventional gear change transmission 24 is interposed between expansible chamber device 12 and drive wheels 10 and 11.

An accumulator 26 stores the hydraulic fluid at high pressure and, in the drive mode, supplies that fluid to the expansible chamber device 12, thus contributing to the driving of the expansible chamber device 12 and, in turn, to the driving of drive wheels 10, 11.

In the braking mode, the preferred embodiment of the present invention achieves braking by one (or a combination) of the following three methods:

1. The motion of vehicle drive wheels 10 and 11 is utilized to drive expansible chamber device 12 as a pump to pump hydraulic fluid into hydraulic accumulator 26;

2. The motion or momentum of drive wheels 10 and 11 is utilized to drive expansible chamber device 12 to pump hydraulic fluid across a dump valve 28 in a bypass return line 30 when accumulator pressure sensor 32 has determined that the fluid pressure within accumulator 26 has reached a predetermined maximum; and 3. Conventional friction brakes 38 and 39 are activated to brake wheels 40 and 41.

Operation in accordance with (1) and (2) above involves interaction with drive wheels 10 and 11 whereas (3) above involves the non-drive wheels 40 and 41.

The braking mode is initiated by depression of brake pedal 42 which, upon depression, travels first through an upper zone A and then through a lower zone B. Position of the brake pedal 42 is determined by pedal position sensor 44. The choice of braking method is determined by a controller, e.g. CPU 46, on the basis of the brake pedal position determined by sensor 44, accumulator pressure determined by pressure sensor 32 and the maximum allowable degree of braking "maximum braking power" or "$P_{max}$" before skidding would occur on the drive wheels.

The position of the brake pedal 42, as determined by position sensor 44, dictates the principal method and degree to which braking should be provided. Within each of zones A and B, the degree of braking power required is taken to vary with the degree of pedal depression, but only up to $P_{max}$ for the upper zone A, i.e., which extends from the release position to the dividing line with zone B which, in turn, correlates with that degree of depression just before slippage of the drive wheels begins.

Given a pre-established road surface condition, i.e., dry or wet, $P_{max}$ can be approximated as a function of vehicle speed by the controller 46. Where braking power is provided by pump 12 in method (1) above, the power extracted by the pump is controlled up to ($P_{max}$) by setting the displacement of the pump, utilizing pump controller 48, in accordance with the accumulator pressure (or discharge line pressure set by pressure drop valve 56 when the accumulator pressure is too low) and the available range of shaft speeds, as determined by the drive wheel speeds (detected by sensors 50 and 51) and the available transmission ratios. In method (2) the setting of the dump valve 28 establishes the discharge line pressure and thereby takes the place of accumulator pressure.

As the brake pedal is depressed through zone A, the power extracted from the wheels 10 and 11 by the expansible chamber device 12, operating as a pump, increases up to $P_{max}$, i.e., up to the value for pressure predetermined to be "just before" expected slippage of the drive wheels under the presumed road conditions, (dry or wet). Initially, braking method (1) is employed in which energy is stored by charging the accumulator with fluid. If wheel slippage does begin to occur, a modulation valve 52 releases pressure through bypass line 30 to discharge the flow of expansible chamber device 12 until slippage stops. If the accumulator pressure is detected to be at a maximum predetermined for the accumulator 26, braking method (2) is initiated whereby the accumulator 26 is not further charged but energy is still hydraulically dissipated.

As the brake pedal is depressed further through zone B, braking methods (1) and (2) continue in operation but, additionally, the pressure of friction brakes 38 and 39 is increased on the non-drive wheels 40 and 41 up to a point where the non-drive wheels would start to slip. If slippage of the non-drive wheels 40 and 41 begins to occur here, a conventional anti-lock pressure modulating valve (not shown) relieves such braking pressure until slippage stops. At this point, the control system increases the braking power extracted by the pump (method (1) and/or (2)) up to where slippage actually begins to occur on the drive wheels.

Accordingly, during braking, the forward momentum of forward kinetic energy of the vehicle is available for recovery via the rotational motion of drive wheels 10 and 11, travelling along a drive shaft 13 and optionally through a transmission 24. Braking is initiated by the driver depressing the brake pedal 42 into zone A. The degree or percentage of depression of the brake pedal within zone A is translated into a value for braking power $P_{b1}$ by the CPU 46, as a percent of the $P_{max}$, i.e., that power projected by the CPU 26 as a value "just before" slippage of the drive wheels 10 and 11 is predicted by the CPU 46. The CPU 46 selects the gear ratio of the transmission 24 and instructs the controller 48 to set the displacement of the pump/motor 12 to achieve the desired $P_{b1}$ by method (1). Fluid is directed through the three-way valve 54 and through the restrictor valve 56 (in a position open sufficiently to provide the necessary pump discharge pressure) and into the accumulator 26. If pressure sensor 32 detects that the accumulator 26 is at the maximum pressure, method (2) is invoked. In method 2, the three-way valve 54 directs the fluid to the dump valve 28 thereby dissipating the hydraulic fluid energy as a pressure drop and feeding fluid to the low pressure reservoir 18, rather than storing it in the accumulator 26. In both of methods (1) and (2) the computer continuously monitors the relative rotational speeds of the drive wheels 10 and 11, as input signals from speed sensors 50 and 51, respectively, and if the drive wheel speeds are found to differ, the computer 46 interprets the difference as wheel slippage and reduces the braking power incrementally by relieving fluid pressure through modulating valve 52 until the slippage stops, i.e., until the speeds of wheels 10 and 11 have equalized.

When the brake pedal enters zone B, the demanded braking power surpasses $P_{max}$. As the driver compresses brake pedal 42 into zone B, hydraulic braking equal to $P_{max}$ continues on the drive wheels as described above, but, in addition, friction braking is provided by brakes 38, 39 on non-drive wheels 40, 41. The percent depression of the brake pedal 42 within zone B is translated to braking power $P_{b2}$ by conventional mechanical means or by the CPU 46. For example, the CPU 46 could compute the pressure in the hydraulic brake line 58 necessary to provide the braking power $P_{b2}$ via the conventional friction brakes 38, 39 acting on the non-drive wheels 40, 41.

The computer 46 also continuously monitors the relative rotational speeds of the non-drive wheels 40 and 41 as detected by speed sensors 60 and 61. If slippage causes speeds of the non-drive wheels 40 and 41 to differ, the control system reduces braking power on the non-drive wheels incrementally by relieving fluid pressure in the hydraulic brake line 58 through a modulating valve 62 until the slippage stops. Meanwhile, depression of the brake pedal 42 continues lower within zone B, the braking power in the drive wheels, (method (1) and/or (2)) increases to its true, instantaneous maximum, i.e., the point where slippage actually begins to occur at the drive wheels.

The zone of operation or "depression level" of the brake pedal 42 could be determined by various alternative means such as driver force or "pressure" on the pedal. A spring or other means could be placed under the pedal to provide a comfortable "feel" to the driver.

In another variation of the present invention, the vehicle could be a four wheel (or all wheel drive vehicle) wherein only zone A of the brake pedal would be employed. However, a zone B frictional brake system could optionally be added on some or all of the drive wheels as a back-up safety system in case of total hydraulic regenerative brake system failure.

Another possible variation would be utilization of an instantaneous, maximized $P_{max}$ value utilizing wheel slip determination, instead of a predetermined $P_{max}$ function, which would require a slip detection with a response transparent to the driver (unobservable), as it would be a more routine, common occurrence.

Yet anther variation of the present invention, as an alternative to elimination of wheel slippage in zone A by relief of fluid pressure through modulating valve 52, would be to reduce pump displacement through a fast-response pump displacement driver, also controlled by computer 46.

Yet another variation of the present invention would involve utilization of a smaller, "trim" pump/motor 12 having a maximum braking power recovery significantly below $P_{max}$. Such an embodiment would represent a lower cost regenerative system, but would require friction brakes on all four wheels, although the drive wheels of the friction brake system would have smaller, less costly components.

Yet another variation of the present invention would eliminate transmission 24, while another variation would position the transmission 24 between engine 22 and pump 20.

Moreover, instead of a hydraulic powertrain, the present invention can, in the alternative, utilize other high power storage and retrieval systems, such a flywheels, electric-ultracapacitors, batteries, etc. For example, pump/motor 12 could be replaced by an electric prime mover, with replacement of accumulator 26 by a battery bank. The prime mover would act as an electric motor in a drive mode and as a generator in a braking mode. The "hydraulic" (or pneumatic) system of the preferred embodiment described above has been used herein merely to illustrate the principles and operation of the invention.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. A vehicular powertrain with regenerative braking comprising:

a plurality of wheels including drive wheels;

a brake pedal which, upon engagement, is activated first into a first zone of operation and then into a second zone of operation;

braking detection means for detecting a released state or an engaged state for said brake pedal and, if in said engaged state, for detecting if in said first or second zone of operation;

friction brakes for braking a pair of said plurality of wheels responsive to detection of said second zone of operation of said brake pedal;

a reversible motor driving said drive wheels in a drive mode and driven by said drive wheels in a braking mode;

motor control means for switching said reversible motor into said braking mode responsive to detection of said engaged state and into said drive mode responsive to detection of said released state;

a primary power source for driving said reversible motor in said drive mode; and a secondary power source, in parallel with said primary power source, for driving said reversible motor in said drive mode and for receiving and storing power from said reversible motor in said braking mode.

2. A vehicular powertrain in accordance with claim 1 additionally comprising a gear change transmission interposed between said reversible motor and said drive wheels.

3. A vehicular powertrain in accordance with claim 1 wherein said braking detection means is a position sensor which senses the position of said brake pedal.

4. A vehicular powertrain with regenerative braking comprising:

a plurality of wheels including drive wheels;

a brake pedal which, upon engagement, is activated first into a first zone of operation and then into a second zone of operation;

braking detection means for detecting a released state or an engaged state for said brake pedal and, if in said engaged state, for detecting if in said first or second zone of operation;

friction brakes for braking a pair of said plurality of wheels responsive to detection of said second zone of operation of said brake pedal;

an accumulator for storing a fluid under pressure;

a reservoir for storing said fluid;

a pump having an inlet connected to said reservoir through a low pressure line and an outlet to a high pressure line connected to said reservoir;

a prime mover for driving said pump;

a reversible, expansible chamber device, located in said high pressure line, for operation as a motor driven by said fluid, to drive said drive wheels in a drive mode and for operation as a pump driven by said drive wheels in a braking mode;

control means for switching said expansible chamber device into said braking mode responsive to detection of said engaged state and into said drive mode responsive to detection of said released state; and switch valve means for connecting said high pressure line to said accumulator in said braking mode and to said reservoir in said drive mode.

5. A vehicular powertrain in accordance with claim 4 additionally comprising a gear change transmission interposed between said expansible chamber device and said drive wheels.

6. A vehicular powertrain in accordance with claim 4 additionally comprising a pressure sensor for sensing the pressure of fluid in said accumulator and dump valve switch means for opening said high pressure line to said reservoir responsive to detection of pressure within said accumulator in excess of a predetermined maximum pressure.

* * * * *